J. J. WOOLSEY.
SHOCK ABSORBER.
APPLICATION FILED SEPT. 20, 1916.

1,264,469.

Patented Apr. 30, 1918.
2 SHEETS—SHEET 1.

WITNESSES:

INVENTOR
John J. Woolsey.
BY Strong & Townsend
ATTORNEYS

J. J. WOOLSEY.
SHOCK ABSORBER.
APPLICATION FILED SEPT. 20, 1916.

1,264,469.

Patented Apr. 30, 1918.
2 SHEETS—SHEET 2.

WITNESSES:

INVENTOR
John J. Woolsey.
BY Strong & Townsend
ATTORNEYS

UNITED STATES PATENT OFFICE.

JOHN J. WOOLSEY, OF BERKELEY, CALIFORNIA, ASSIGNOR OF ONE-HALF TO G. H. HURD, OF BERKELEY, CALIFORNIA.

SHOCK-ABSORBER.

1,264,469.   Specification of Letters Patent.   Patented Apr. 30, 1918.

Application filed September 20, 1916. Serial No. 121,165.

*To all whom it may concern:*

Be it known that I, JOHN J. WOOLSEY, a citizen of the United States, residing at Berkeley, in the county of Alameda and State of California, have invented new and useful Improvements in Shock-Absorbers, of which the following is a specification.

This invention relates to shock absorbers for vehicles, particularly automobiles, and has for its object to simplify and improve the construction and operation of such devices.

In the usual type of shock absorber to which this invention relates, the ordinary leaf spring is connected at one end to a lever arm, and the latter is fulcrumed on a portion of the axle. The free end of the lever arm is connected to a spring which is attached to the overlying frame or supported upon the leaf spring itself. Such an arrangement requires separate springs for each lever arm, and necessitates the use of shorter and stiffer springs than is desirable to give the required degree of cushion. In operation these separate springs will have unequal strains imposed upon them, inasmuch as a shock at one corner of the automobile will cause the majority of the load to be transmitted to the adjacent spring, while the opposite spring will be almost entirely relieved of the load. In many instances these separate and independent shock absorbing springs do not have the same resilience, and therefore there is not an equality of cushioning at all points on the car. The connection of these springs to the overlying frame also causes an excessive strain to be imposed upon the superstructure.

In the present invention I employ in combination with the usual load supporting leaf springs of an automobile, lever arms between the springs and the axle arranged so that the oppositely disposed lever arms have their free ends movable away from each other when the springs are under compression, and a spring connection between the free ends of the oppositely disposed lever arms whereby the inter-connected parts act in series to relieve the shocks, and a longer shock absorbing spring is made possible, and the other objections already noted, overcome.

In the accompanying drawing I have shown in Figure 1 an application of my invention to the front spring of a well known type of automobile.

Figure 1:
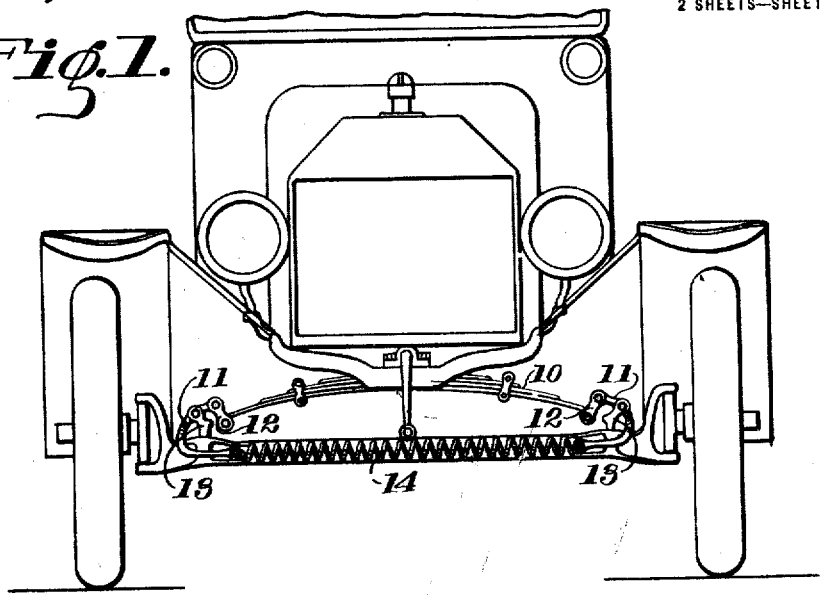

In Fig. 1, a front elliptical leaf spring 10 transversely disposed is connected at its opposite ends to bent or bell crank levers 11 by means of short links 12. A bracket or standard 13 rigid with the axle, forms a fulcrum support for each of the bell crank levers, and the free ends of the levers project downwardly and inwardly. The downwardly projecting ends of the levers at opposite ends of the spring are movable away from each other when the spring 10 is under compression, and these free or oppositely movable ends are connected together by means of a contractile coil spring 14 extending parallel with the axis of the vehicle. The bell crank levers may be forked to straddle the axle, and in such cases I prefer to employ a spring 14 on either side of the axle.

Figure 2:
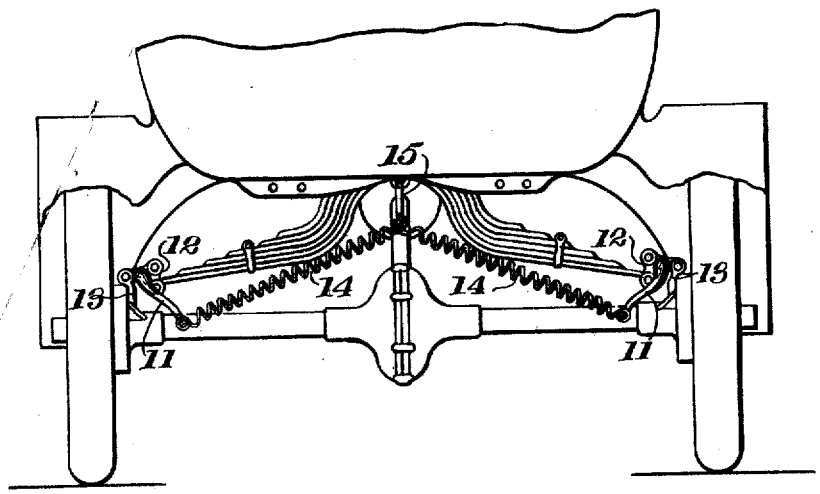
Fig. 2 shows an elevation of the rear spring of the same type of automobile equipped with my invention.
Figure 3:
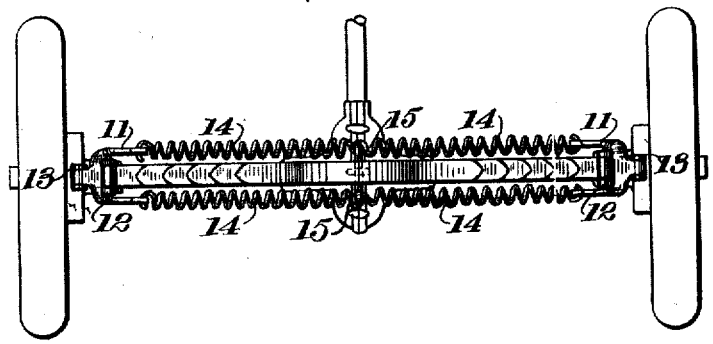
Fig. 3 shows a plan view in detail of the connections employed on the rear spring.

A rear spring is shown in Fig. 2 and a similar shock absorbing device applied thereto, with the exception that hanger bars 15 are employed in the spring connections 14 to support the same over the differential housing. Such hanger bars are suspended from the overlying frame and free to move endwise so that the springs at opposite ends work in unison and in effect constitute a single spring.

Figure 4:
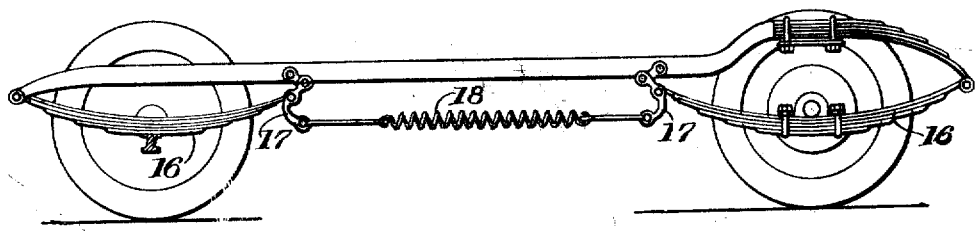
Fig. 4 shows an elevation of a different type of load supporting leaf springs embodying my invention.

As shown in Fig. 4 my invention may be applied to a type of load supporting springs wherein the leaves 16 are longitudinally disposed. In this instance the front and rear springs on one side of the automobile have their bell crank levers 17 extended downwardly, with the free ends movable away from each other, and connected together by a single spring 18 very much in the manner of the forms already described.

It is obvious that an improved cushioning action will result from the above arrangement inasmuch as the shocks will be equally distributed upon opposite ends of the single leaf spring or upon adjacent ends of opposite leaf springs. The interconnected bell crank levers will coöperate in such a way that a shock received by one will be transmitted to the other through the medium of the coil spring connection. When one bell crank lever is moved downwardly the coöperating one is simultaneously pulled upwardly, so that both act together and in series at all times to support the load. When not connected together in this way, one bell crank lever and its individual shock absorbing spring will receive the shock from its respective wheel, in consequence of which a large proportion of the weight of the automobile at this end will be supported by the single shock absorbing spring, whereas an oppositely disposed shock absorbing spring will be relieved to a large extent from the weight of the load. This means that larger and stiffer springs must be employed with a consequent interference with the freedom of cushioning, and in spite of this the excessive strains imposed upon the individual springs will result in an early destruction thereof. It will be noted also that by the connection of opposite bell crank levers together, there is no excessive strain imposed upon the super-structure as when the individual springs are employed for each bell crank lever and such springs connected to the overlying frame.

In addition to the foregoing advantages there is a simplification in parts and a resultant economy of construction by the use of one spring in the place of two.

Other modifications and arrangements in addition to those shown and described may obviously be employed without departing from the spirit of my invention as disclosed in the appended claims.

Having thus described my invention, what I claim and desire to secure by Letters Patent is:—

1. In a vehicle, a leaf spring between the axle and body, bell crank levers pivoted between their ends to the axle, the bell cranks having upper arms extending toward and disposed above the ends of the leaf spring and having rigid lower arms extending toward the center of the axle, a coil spring connection between said lower arms of the bell cranks, and links connected to the upper ends of the bell cranks and depending therefrom and connected to the respective ends of the leaf spring.

2. In a vehicle, a leaf spring between the axle and body, forked bell crank levers pivoted between their ends to the axle and straddling the latter, the bell cranks having upper arms extending toward and disposed above the ends of the leaf spring and having rigid lower arms extending toward the center of the axle, pivotally suspended hanger bars depending from the vehicle, and coil springs connected at their ends to the hanger bars and to the lower arms of the bell cranks, and links connected to the upper ends of the bell cranks and depending therefrom and connected to the respective ends of the leaf spring.

3. In a vehicle, a chassis element, a leaf spring element, bell cranks pivoted to one of said elements and having rigid lower ends, coil spring means common to and connected at each of its ends to said lower ends of the bell cranks, and links pivoted to the upper ends of the bell cranks and to the other of said elements, the pivotal points of the bell cranks being located beyond the respective ends of the coil spring means.

In testimony whereof I have hereunto set my hand in the presence of two subscribing witnesses.

JOHN J. WOOLSEY.

Witnesses:
JOHN H. HERRING,
W. W. HEALEY.